United States Patent Office 3,298,228
Patented Jan. 17, 1967

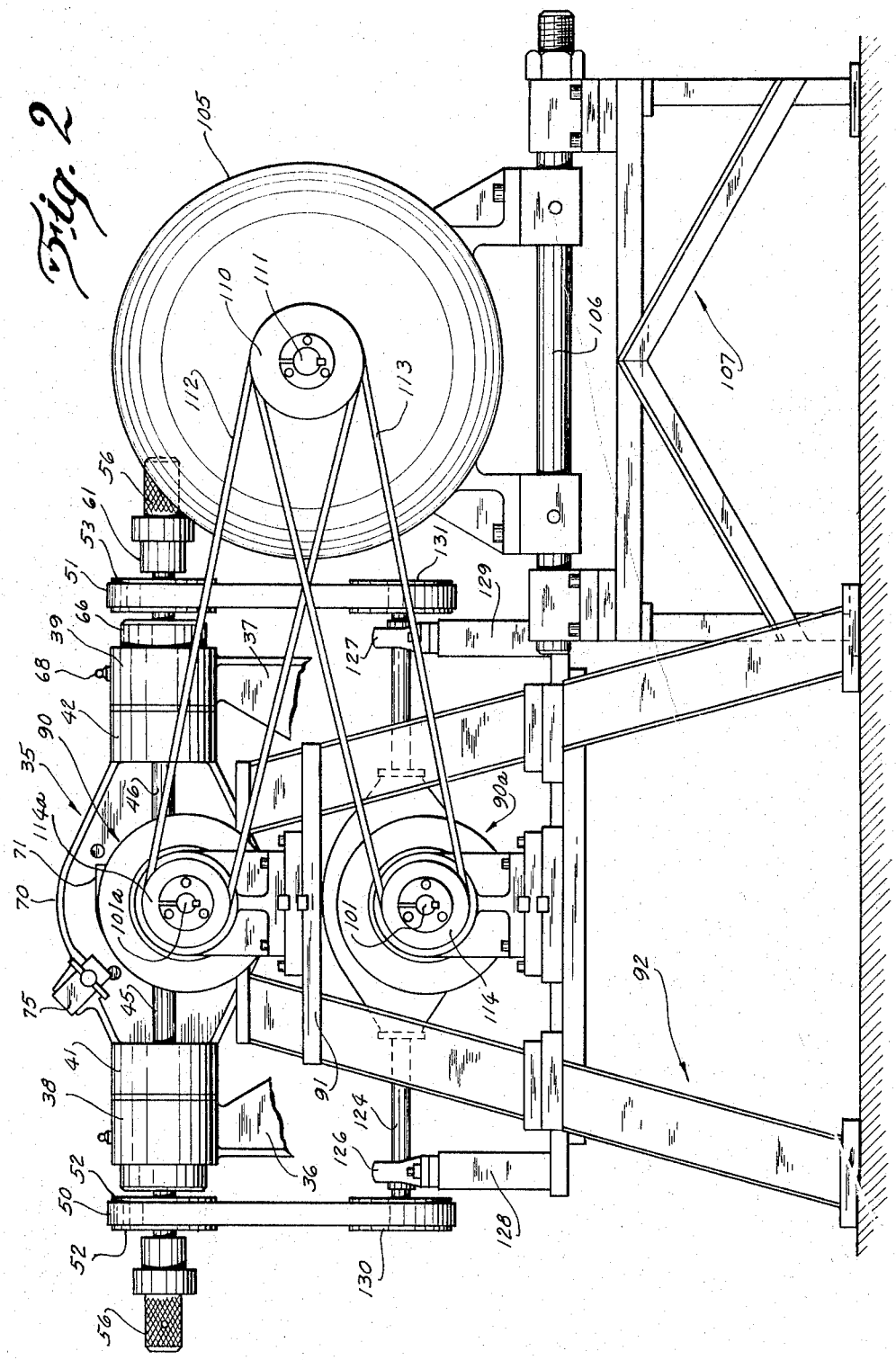

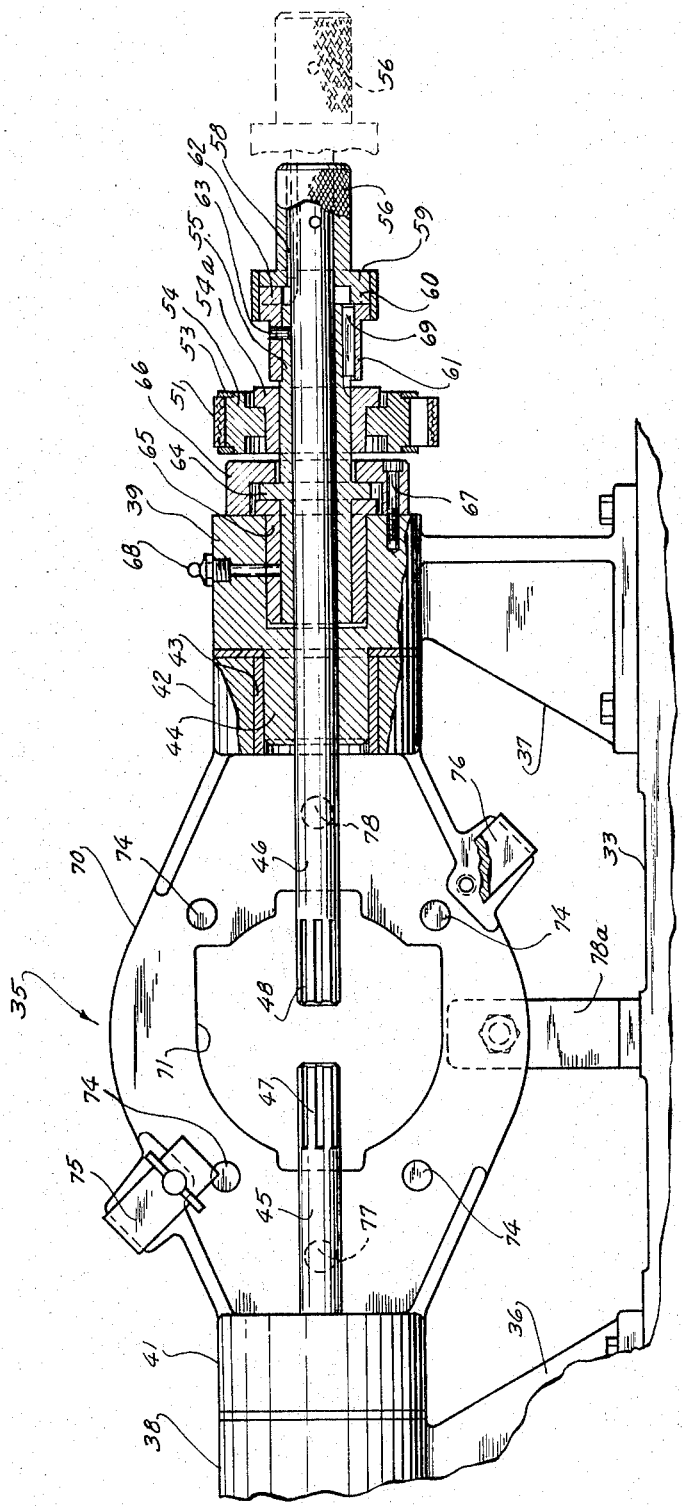

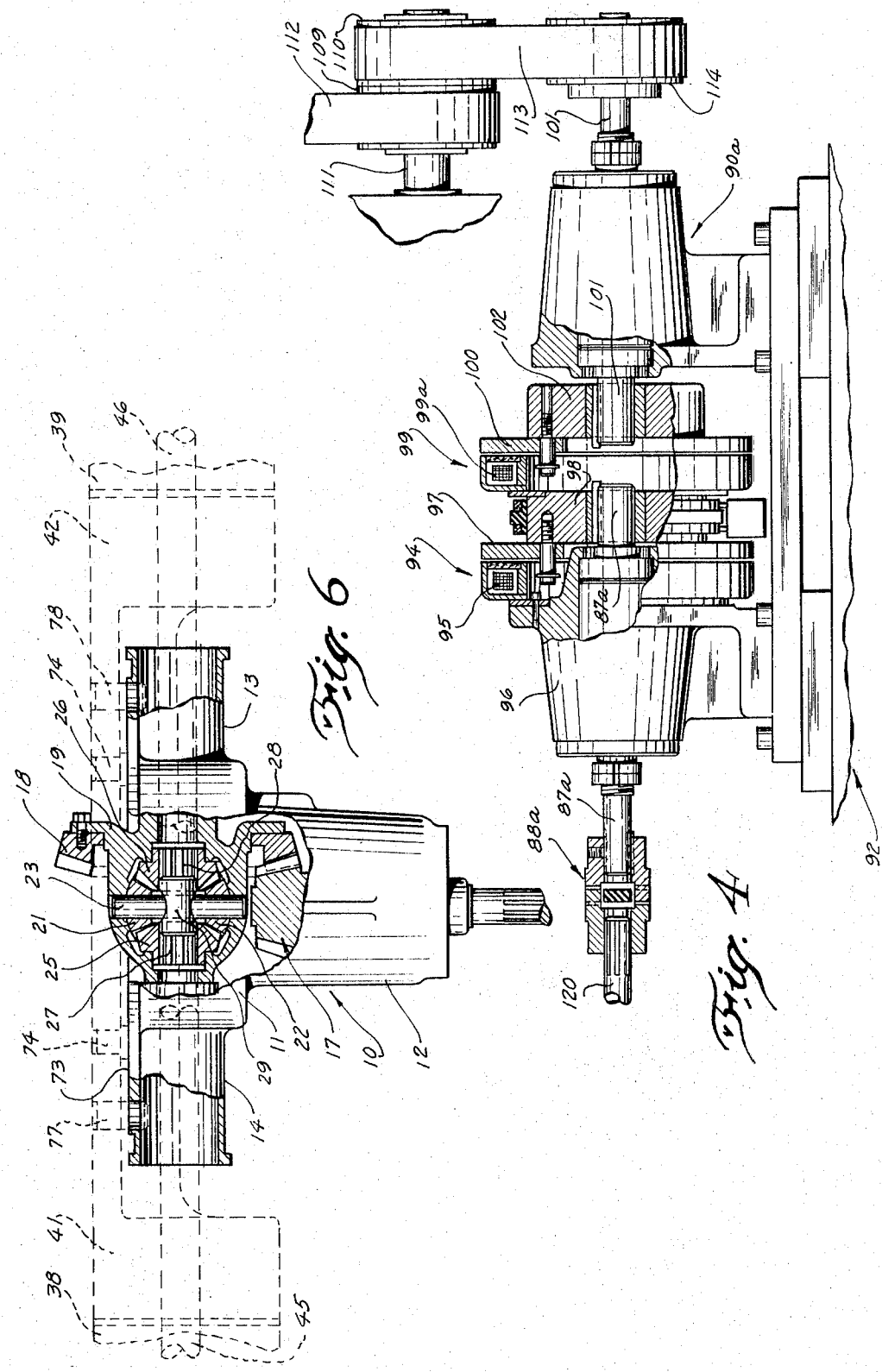

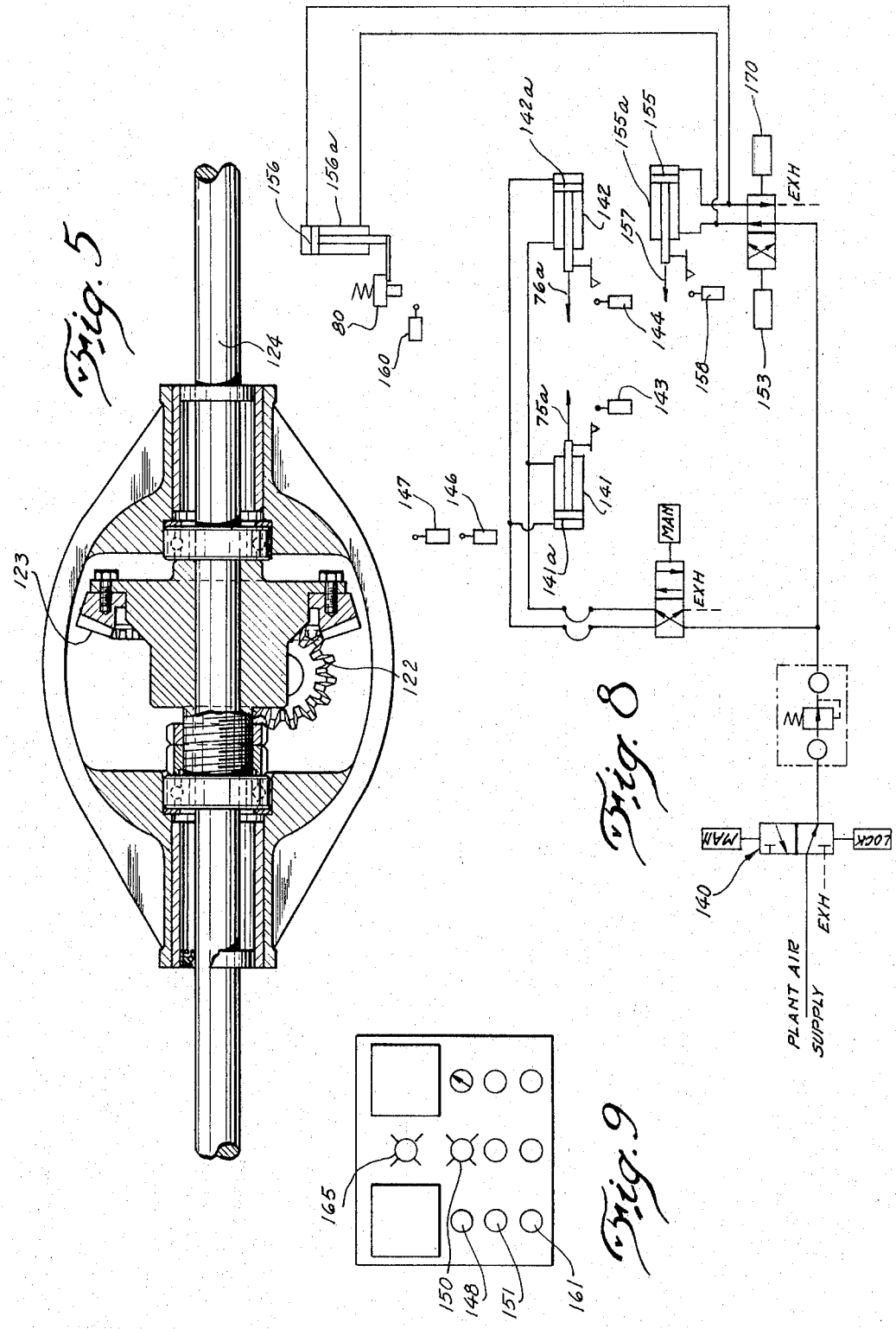

3,298,228
DIFFERENTIAL TESTING MACHINE
George Oltean, Richard C. Mortensen, Paul J. Jessen, and Daniel Greenwald, all of Kenosha, Wis., assignors to American Motors Corporation, Kenosha, Wis., a corporation of Maryland
Filed Dec. 26, 1963, Ser. No. 333,298
5 Claims. (Cl. 73—162)

The invention relates to a testing machine for testing a housed gear assembly such as the differential mechanism of a rear axle assembly for an automotive vehicle.

In a conventional passenger automobile of the rear wheel drive type, the engine transmits the driving torque through a transmission, propeller shaft, differential mechanism and then through the rear axle shaft to the rear wheels and thence to the vehicle body. Under driving conditions in which the engine is being accelerated, the driving torque is being transmitted from the engine to the rear wheels. When the driver releases such acceleration, then the engine decelerates and the forward momentum of the vehicle causes the rear wheels to transmit a driving torque to the engine.

The principal object of the invention is to provide a testing machine which simulates the true operating conditions of the automotive vehicle both when the engine is imparting driving torque to the rear wheels and also when the rear wheels are imparting a driving torque to the engine. In prior art testing devices, simulations of vehicle operation during acceleration was accomplished, however, such testing devices did not simulate true vehicle operation conditions under deceleration.

A specific object of the invention then is to provide a testing machine which simulates vehicle acceleration by imparting driving torque to the differential pinion gear and which simulates vehicle deceleration by imparting driving torque to the rear axle equivalents instead of to the pinion gear.

Other objects and advantages of a specific nature will be apparent as the specification proceeds.

In the drawings, FIGURE 1 is a side elevational view of the testing machine with a differential assembly in test position.

FIGURE 2 is an end view of the machine of FIGURE 1 taken at the motor end thereof and with the test room wall removed.

FIGURE 3 is a detail view of the fixture which holds the differential assembly—a portion of such fixture and associated components being shown in section.

FIGURE 4 is a sectional detail view of one of the clutch-brake units employed with the machine.

FIGURE 5 is a sectional detail view of a slave unit employed with the machine.

FIGURE 6 is a sectional view of a conventional differential mechanism of the type to be tested by the testing machine.

FIGURE 8 is a schematic showing of a pneumatic control system which may be employed with the machine.

FIGURE 9 is a schematic showing of a control panel which may be employed with the apparatus of FIGURES 7 and 8.

Figure 1:
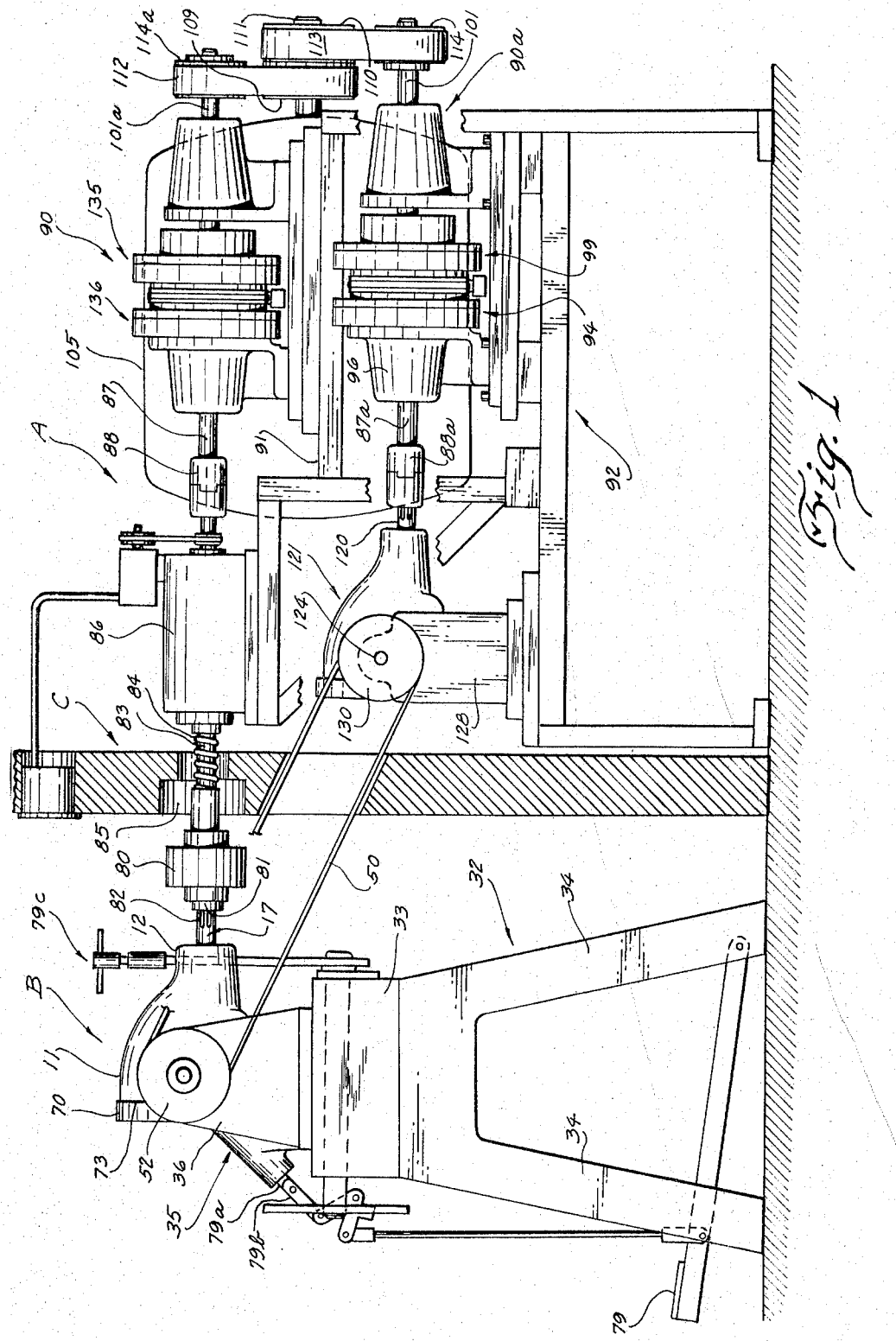

Referring to FIGURE 6, we have shown a conventional differential mechanism of the type used on a passenger automobile. The differential mechanism includes a housing 10 which includes the central body portion 11, the forwardly extending portion 12 and the transversely extending portions 13 and 14. Axle housings (not shown) are telescopically received within the extensions 13 and 14, however, not until after the differential mechanism has been tested and approved. The differential gearing includes the driving gear or pinion 17 which is supported by suitable bearings within the housing portion 12 and the pinion gear meshes with the driven or ring gear 18 which is anchored to the end face of the gear carrier 19 within which the gear cluster is situated. The gear cluster includes idler gears 21 and 22 which are carried on the pin 23 which is anchored in opposite side walls of the carrier. The axle gears 25 and 26 mesh with each of the idler gears and the inner ends of the axles (not shown) are splined for driving engagement with the respective internal splines 27 and 28 of the axle gears. Each of the axle shafts lead to a vehicle wheel (not shown) for imparting driving torque to same. A thrust block 29 is telescopically mounted on the pin 23 and is engageable by the ends of the axle shafts for limiting the axial movement thereof.

In the normal operation of the automotive vehicle when the engine is operated under acceleration conditions, the engine is imparting driving torque to the pinion gear 17 which in turn imparts driving torque to the ring gear 18. The carrier 19 is thus being driven along with the ring gear and as the carrier is rotated, the idler gears 21 and 22 impart driving torque to the axle gears 25 and 26. Under normal driving conditions in which the automobile is proceeding along a dry highway, each axle shaft will be transmitting an equal amount of torque to its respective rear wheel and there will be no relative rotation of axle gears and idler gears, i.e., the gear cluster within the carrier 19 will rotate along with the carrier without encountering relative rotation between axle gears and idler gears. This condition of operation of the differential assembly is simulated by the testing machine.

Under deceleration conditions, the forward momentum of the vehicle causes the vehicle wheels to impart driving torque to the axles, which in turn impart driving torque to the various gears in the differential assembly so that ultimate driving torque is imparted to the pinion gear 17 and thence to the engine, the engine thus becoming a braking force or the load. Thus, it can be seen that under acceleration conditions, the various gear teeth are under load conditions on certain faces thereof while under deceleration conditions, the opposite faces of the gear teeth are under load conditions. The objective is to test the operation of the gears under each of these types of load conditions.

The aforementioned described differential mechanism is of conventional construction and it will be understood that the axle shafts are not in assembled position until after the differential mechanism has been tested on the testing machine. Likewise, the axle housings are not assembled to the differential housing extensions 13 and 14 until after testing has taken place.

Referring to FIGURES 1 and 2 the testing machine consists of the units A and B which are preferably situated on opposite sides of a partition wall C. The partition wall C may consist of an insulated wall which forms one wall of a separate testing room. The unit A is situated exteriorly of the test room. The reason for this arrangement is that the most important test is a noise test in which the differential mechanism being tested is checked for undesirable, noisy gear operation. The noise test can, if desired, be simply by human ear and is best conducted within a sound insulated test room.

Referring to FIGURES 1, 2 and 3 the unit B generally includes a stand and testing fixture. The stand 32 includes a bed portion 33 and supporting legs 34. The testing fixture 35 is carried between spaced bearing brackets 36 and 37 which are anchored to the bed and which include the bearing housing portions 38 and 39.

The test fixture has end portions 41 and 42 which are provided with sleeve bearings 43 permitting the fixture to swivel about the trunnions 44 which are formed on the bearing housings 38 and 39. The test axles 45 and 46 simulate the vehicle axles during the testing operation. The splined ends 47 and 48 of the simulated axles (or axle equivalents) are received within the axle gears 25 and 26 in a manner similar to conventional axles. Referring to FIGURES 2, 3 and 6, the simulated axles 45 and 46 are driven by the belts 50 and 51 which are trained about the pulleys 52 and 53. The pulleys are of conventional construction and the hub portions 54–54a thereof are secure with the sleeves 55. The sleeves 55 encircle the simulated axles and are drivingly connected to same as follows.

It will be understood that the construction details of the components at either end of the test fixture are identical and the following description will be confined to one end only, as shown in section in FIGURE 3. A hand grip 56 is in driving engagement with the end of the axle equivalent 46 as by means of a suitable key 58 and has a radially outwardly projecting portion 59 which has clutch teeth 60 formed thereon. Sleeve member 61 has clutch teeth 62 formed at the outer end for engagement with the clutch teeth 60. The hub portion of the clutch sleeve is keyed to sleeve 55 by means of a suitable key 69 and a pin 63 prevents any possible axial movement of sleeve 61 relative to sleeve 55. Thus, the rotation of sleeve 55 by pulley 53 is transmitted to the axle equivalent 46.

The clutch teeth are of a conventional construction and are inclined in a manner (not shown) with reference to each other so as to prevent disengagement of the clutch when the axle equivalent is being driven during testing. The sleeve 55 has a radially outwardly projecting annular flange 64 situated between the end face of bearing bushing 65 and the inner face of bearing cap 66 to prevent axial movement of such sleeve during rotation thereof.

The bearing cap 66 is removably anchored to the end face of the bearing housing 39 as by means of bolts 67. A grease fitting 68 may be provided for lubrication of the sleeve bearing and sleeve 55.

The testing fixture has an enlarged body portion 70 intermediate the end portions 41 and 42 which accommodates the differential housing and a large opening 71 accommodates that portion of the ring gear 18 and carrier which project therethrough (see FIGURE 6). The rear face 73 of the differential housing is generally flat and is located against the flat head pins 74 preparatory to clamping the differential housing in the fixture by means of the clamps 75 and 76. Suitable locating pins 77 and 78 project into openings in the extension portions 13 and 14 of the differential housing for proper positioning of the housing within the fixture.

During mounting of the differential housing within the fixture, the axle equivalents 45 and 46 are manually retracted, as shown in dotted lines in FIGURE 3, by grasping the hand grips 56 and then the splines 47 and 48 are manipulated into engagement with the gear splines 27 and 28.

Viewing FIGURE 3, the test fixture is preferably rotated 90° to a position permitting insertion of the differential assembly housing from above. The clamping of the differential housing within the fixture is effected prior to rotating the fixture into test position as shown in FIGURE 3. A stop 78a may be anchored to the frame bed 33 for limiting rotation of the fixture beyond proper test position (the position in which pinion 17 is in axial alignment with the axis of drive coupling 80 as shown best in FIGURE 1). After rotation of the test fixture to test position, the foot treadle 79 can be released to permit holding and indexing pin 79a at the end of link 79b to move upwardly into an opening (not shown) in the differential housing for holding the test fixture against rotation about its end trunnions. This indexing mechanism is conventional and need not be explained in any further detail. The foot treadle arrangement can also be replaced with a pneumatically operated shot pin instead of pin 79a, as will be explained hereinafter. A clamping device 79c is also conventional and can be employed to hold the forward portion 12 of the differential housing during the testing operation.

The drive coupling 80 is of conventional construction and includes an internally splined outer end 81 into which the splined end 82 of the pinion gear is drivingly connected. The coupling is drivingly connected to shaft 83 while also being axially shiftable along the length of the shaft. A compression spring 84 normally urges the drive coupling into driving engagement with the splined end of pinion gear 17. Such coupling is retractable into the pocket area 85 of test room wall C preparatory to establishing driving connection with the pinion gear. The shaft 83 extends through a suitable bearing housing 86 and is coupled to shaft 87 by means of a suitable coupling 88.

A conventional clutch and brake unit identified generally by the numeral 90 is mounted on base member 91 which is fabricated as part of the over-all supporting frame identified generally by the numeral 92.

Referring briefly to FIGURE 4, a second clutch and brake unit 90a is shown and the construction of this unit may be similar to the unit identified by the numeral 90. Thus, the description of the unit 90a will equally apply to unit 90. The clutch and brake unit may include a brake assembly identified generally by the numeral 94 and a clutch assembly identified generally by the numeral 99. The brake coil 95 is fixed to the stationary housing 96 and the brake armature assembly 97 has its hub portion 98 keyed to shaft 87a so as to rotate therewith. The clutch coil 99a is secured to the hub member 98 so as to rotate therewith and the clutch armature 100 is fixed to shaft 101 by the hub portion 102 being keyed to such shaft. Thus, when the clutch armature is engaged with the clutch coil the shaft 101 will impart driving rotation to shaft 87a. It will be understood that the clutch and brake unit 90 operates in the same manner as the immediate foregoing clutch and brake unit.

Referring briefly to FIGURE 2, it will be noted that an electric motor 105 is adjustably carried on rods 106 which are mounted on the supporting frame, which is identified generally by the numeral 107. The motor may be of a type identified as a liquid cooled eddy-current adjustable speed drive in which the speed of the motor may be adjusted with appropriate electrical controls specifically provided therefor. Such adjustable speed motor units are conventional and are available commercially.

A pair of pulleys 109 and 110 may be secured to the motor shaft 111 and suitable flexible belts 112 and 113 transmit drive to the drive shafts 101 and 101a of the clutch-brake units through the medium of pulleys 114 and 114a. Thus, during operation of the motor unit, the shafts 101 and 101a are being rotated preparatory to use of the clutch-brake units during the testing operation.

The shaft 87a is drivingly connected to pinion shaft 120 through coupling 88a for activating the slave unit identified generally by the numeral 121.

Referring briefly to FIGURE 5, the pinion gear 122 which is formed at the inner end of pinion shaft 120 meshes with ring gear 123 which in turn is drivingly connected to shaft 124. Shaft 124 is thus driven at a predetermined speed dependent upon the ratio of gear 122 to gear 123. This gear ratio can be correlated with the gear ratio existing between pinion gear 17 and ring gear 18 of the differential assembly being tested (see FIGURE 6). Shaft 124 is rotatably supported in bearing housings 126 and 127 which are anchored to the supporting members 128 and 129. The support members are carried on the frame 92. Pulleys 130 and 131 are secured at opposite ends of the shaft 124 and the belts 50 and 51 are trained about the respective pulley sets 52–130 and 53–131.

In the general operation of the testing machine, the initial step involves loading the differential assembly into the test fixture. The fixture can be manually rotated to a position in which the clamps 75 and 76 are directed upwardly. The clamps would be loosened and the differential assembly would be loaded into the fixture from above with the flat surface of the differential housing lowered onto the pins 74 and locating pins 77 and 78 guided into the housing openings. Then the clamps are tightened for anchoring the differential assembly in the fixture. Foot treadle 79 would be lowered to retract the indexing pin 79a and then the fixture would be rotated 90° to test position shown in FIGURES 1, 2 and 3. Release of the foot treadle would engage the indexing pin with the differential housing to lock the fixture in test position and clamp 79c would assist in holding the differential assembly so that pinion 17 would be properly axially aligned with coupling 80. Coupling 80 would be manually shifted axially into the wall pocket 85 prior to rotation of the test fixture into test position, then release of the coupling will bring its splined end into driving engagement with the splined end of pinion 17.

The motor 105 may be operating continuously, if desired, while awaiting the loading of the test fixture and with the coupling 80 engaged with pinion 17, the clutch 135 is ready for engagement. The brake 94 is engaged to provide the desired resistance to simulate the load at the automobile wheels. The clutch 135 thus drives shaft 87, coupling 88, shaft 83, coupling 80, pinion 17, ring gear 18, gear carrier 19 and its associated gear cluster, axle eqivalents 45 and 46, pulleys 52 and 53, belts 50 and 51, pulleys 130 and 131, slave shaft 124, gear 123, pinion 122, coupling 88a, shaft 87a and brake 94. Speed can be increased from a low to a high range to simulate acceleration of the speed of the automobile engine. The resistance offered by the brake 94 can be varied during acceleration of motor speed to simulate the conditions encountered when accelerating the speed of the automobile.

Then, to simulate a condition of deceleration or coasting of the automobile, wherein the rear wheels "drive" the engine, the clutch 135 will be disengaged and clutch 99 will be engaged. Brake 94 is disengaged and brake 136 is engaged. The amount of resistance offered by brake 136 will be predetermined to simulate the load imposed by the automobile engine under coasting conditions. With clutch 99 engaged and brake 136 engaged, the motor 105 will drive shaft 111, pulley 110, belt 113, pulley 114, shaft 101, clutch 99, shaft 87a, coupling 88a, pinion gear 122, gear 123, shaft 124, pulleys 130 and 131, belts 50 and 51, pulleys 52 and 53, axle equivalents 45 and 46, gear carrier 19 and its associated gear cluster, ring gear 18, pinion 17, coupling 80, shaft 83, coupling 88, shaft 87 and brake 136.

While it will be understood that most of the components of the testing machine could be actuated manually preparatory to applying driving torque initially to the differential pinion gear and then subsequently to the axle equivalents, it will be apparent that the operation of the testing machine can be improved by utilizing commercially available equipment and employing the versatility of such equipment to best advantage. Thus, for example, it is considered advantageous to employ electromagnetic type clutches (99 and 135); electro-magnetic type brakes (94 and 136); and a liquid cooled adjustable speed electric motor and magnetic coupling type of power unit (105). This equipment may be briefly described as follows.

The power unit 105 may consist of two basic assemblies—a standard squirrel cage induction motor mounted to a liquid cooled stationary field type coupling. The combination of motor and coupling provides accurately controlled, stepless adjustable speed and will hold constant output speed regardless of load changes. Torque developed in the motor is transmitted through the coupling by electro-magnetic attraction between the driving and driven members thereof. The amount of torque transmitted from driving to driven member varies with the current applied to the field coil and with the "slip" or difference in speed between such members.

The clutches 99 and 135 and the brakes 94 and 136 are electro-magnetic disc-type friction devices which, when electrically energized, become engaged and are then capable of transmitting torque. The speed of engagement may be controlled by varying the voltage applied to the field coil and transmitted torque is proportional to the applied voltage. Each of the clutches and brakes is energized by means of D.C. power and hence A.C. input voltage is rectified to D.C. by means of a full wave bridge rectifier and filtered with a resistor and capacitor. Other electrical control equipment is needed for use with the power unit 105 and the clutches and brakes and will not be described in detail.

In addition to the use of the briefly described foregoing electrical equipment, other peripheral equipment may be utilized for improving the operation of the testing machine and such peripheral equipment can be correlated with the electrical equipment for effecting the opening and closing of electrical circuits while simultaneously effecting appropriate mechanical functions. Such peripheral equipment is indicated schematically in FIGURE 8 and will be described only briefly.

Thus, in a typical program of operation of the testing machine, it may be desired to initially impart torque to pinion 17 and within a period of about 6 seconds to accelerate the speed to about 2500 r.p.m. Then it may be desired to maintain this speed for a period of about 2 seconds. Then the clutch 135 and brake 94 can be disengaged and clutch 99 and brake 136 can be engaged to establish the "coast" cycle for about 5 seconds. The clutch 99 and brake 136 can then be disengaged preparatory to removing the differential from the test fixture.

Figure 7:
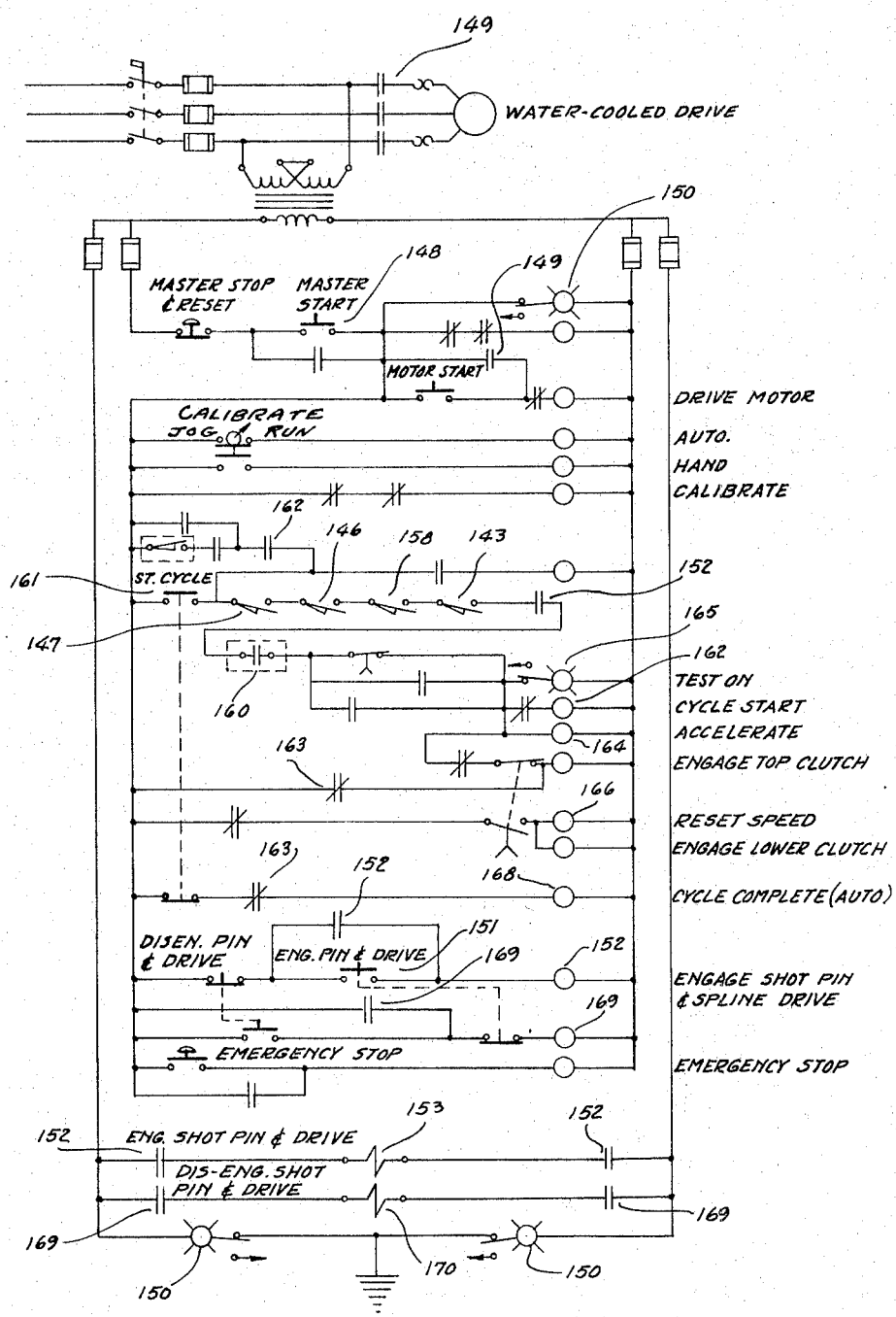
FIGURE 7 is a diagram of a form of circuitry employed in conducting a pre-selected test program with the machine.

Referring to FIGURES 7, 8 and 9, the operation of the testing machine to effect the program referred to in the preceding paragraph may be as follows. The operator loads the differential assembly into the test fixture and then actuates manual air valve 140. Air pressure enters the rod ends of cylinders 141 and 142 shifting the pistons 141a and 142a to actuate the clamps 75a and 76a for clamping the differential assembly within the test fixture. The actuation of the clamps closes switches 143 and 144. The operator then manually rotates the test fixture to test position which closes switch 146. The operator then engages the axle equivalent splines 47 and 48 with gear splines 27 and 28 which closes switch 147. The operator then presses "master start" push button 148 which closes relay 149, lighting the "power on" lamp 150. The operator then presses "engage pin and drive" push button 151 which closes circuit relay 152 energizing solenoid 153 which actuates the valve 154 which controls the operation of the pistons 155 and 156 in air cylinders 155a and 156a. The shifting of piston 155 engages the shot pin 157 with the differential housing while also closing switch 158 and the shifting of piston 156 engages the coupling 80 with the splines of pinion 17 while also closing switch 160. The operator then presses the "start cycle" push button 161 energizing circuit relay 162 while de-energizing circuit relay 163 and energizing timing relay 164 and the "test on" lamp 165. The clutch 135 is energized. Acceleration to 2500 r.p.m. occurs. Timing relay 164 then de-energizes and timing relay 166 is energized. Clutch 135 is de-energized and clutch 99 is engaged. Brake 94 remains in speed control until the power unit 105 reestablishes a new speed. Brake 136 is then energized for the "coasting" cycle wherein deceleration occurs until pinion 17 reaches zero speed. Circuit relay 162 is de-energized and timing relay 168 is energized placing full excitation on brake 136 and circuit relay 169 is energized. Solenoid 170 is energized causing shifting of pistons 155 and 156 to disengage the shot pin 157 and coupling 80 from pinion 17. The operator can then rotate the test fixture preparatory to removing the differential assembly therefrom.

We claim:

1. A machine for testing the differential assembly of an automotive vehicle in which such assembly includes: a differential housing, a pinion gear in the housing, a ring gear engaged with the pinion gear and having an axis of rotation transverse to the axis of rotation of the pinion gear, a carrier secure with the ring gear, differential idler gears carried by the carrier, differential axle gears engaged with the differential idler gears, said testing machine comprising:

a stand;
a fixture on the stand for holding the differential housing during testing;
simulative axle shafts carried on the fixture for rotative movement about an axis transverse to the axis of rotation of the pinion gear and for axial movement relative to the fixture;
a power unit;
a first drive train between the power unit and the pinion gear;
a second drive train between the power unit and the simulative axle shafts;
a slave unit interposed in the second drive train for converting the direction of rotation of the second drive train;
a first clutch and a first brake in the first drive train;
a second clutch and a second brake in the second drive train;
means for selectively engaging the sceond clutch to establish driving engagement between the power unit and the simulative axle shafts and means for engaging the first brake to impose a load on the simulative axle shafts and the gears of the differential assembly.

2. A machine for testing the differential assembly of an automotive vehicle in which such assembly includes: a differential housing, a pinion gear in the housing, a ring gear engaged with the pinion gear and having an axis of rotation transverse to the axis of rotation of the pinion gear, a carrier secure with the ring gear, differential idler gears carried by the carrier, differential axle gears engaged with the differential idler gears, said testing machine comprising:

a stand;
a fixture on the stand for holding the differential housing during testing;
simulative axle shafts carried on the fixture for rotative movement about an axis transverse to the axis of rotation of the pinion gear and for axial movement relative to the fixture;
said simulative axle shafts having releasable driving engagement with the differential axle gears;
a power unit;
a first drive train between the power unit and the pinion gear;
a second drive train between the power unit and the simulative axle shafts;
a slave unit interposed in the second drive train for converting the direction of the rotation of the second drive train;
a clutch and a brake in the first drive train;
a clutch and a brake in the second drive train;
means for selectively engaging the clutch in the first drive train and the brake in the second drive train, whereby the pinion gear imparts driving thrust through the ring gear, differential idler gears, differential axle gears and simulative axle shafts to the brake in the second drive train and
means for selectively engaging the clutch in the second drive train and the brake in the first drive train, whereby the simulative axle shafts impart driving thrust to the differential axle gears, the differential idler gears, the ring gear and the pinion gear to the brake in the first drive train.

3. A testing machine as set forth in claim 2 wherein means are provided for varying the torque resistance of the brakes.

4. A machine for testing the differential assembly of an automotive vehicle in which such assembly includes: a differential housing, a pinion gear in the housing, a ring gear engaged with the pinion gear and having an axis of rotation transverse to the axis of rotation of the pinion gear, a carrier secure with the ring gear, differential idler gears carried by the carrier, differential axle gears engaged with the differential idler gears, said testing machine comprising:

a stand;
a fixture swively mounted on the stand for holding the differential housing during testing;
simulative axle shafts carried on the fixture for rotative movement about an axis transverse to the axis of rotation of the pinion gear and for axial movement relative to the fixture:
said simulative axle shafts having releasable driving engagement with the differential axle gear;
a pulley drivingly connected to each simulative axle shaft;
a power unit;
a first drive train between the power unit and the pinion gear;
a second drive train between the power unit and the simulative axle shafts;
a slave unit interposed in the second drive train and including a housing and a shaft rotatively carried by the housing and also including gears for converting the direction of rotation of the second drive train;
a clutch and a brake in the first drive train;
a clutch and a brake in the second drive train;
means for selectively engaging the clutch in the first drive train and the brake in the second drive train whereby the pinion gear imparts driving thrust through the ring gear, differential idler gears, differential axle gears and simulative axle shafts to the brake in the second drive train and
means for selectively engaging the clutch in the second drive train and the brake in the first drive train, whereby the simulative axle shafts impart driving thrust to the differential axle gears, the differential idler gears, the ring gear and the pinion gear to the brake in the first drive train;
pulleys at the opposite ends of the slave unit shaft;
belts trained about the pulleys on the simulative shafts and the pulleys on the slave unit shaft.

5. Apparatus as set forth in claim 4 wherein a coupling is interposed in the first drive train and is selectively retractible to disengage said coupling from the differential pinion gear.

References Cited by the Examiner
FOREIGN PATENTS
1,211,765 10/1959 France.
922,152 3/1963 Great Britain.

DAVID SCHONBERG, *Primary Examiner.*